United States Patent [19]

Nell et al.

[11] Patent Number: 5,214,093
[45] Date of Patent: May 25, 1993

[54] ADHESIVE FORMULATION FOR NONSURGICAL BLEPHEROPLASTY

[76] Inventors: Edward R. Nell, 135 Victoria La., Aptos, Calif. 95003; Dean B. Parkinson, 420 W. Oakwood Blvd., Redwood City, Calif. 94061

[21] Appl. No.: 689,012

[22] Filed: Apr. 22, 1991

Related U.S. Application Data

[63] Continuation-in-part of Ser. No. 446,394, Dec. 5, 1989, abandoned.

[51] Int. Cl.$^5$ .......................... C08L 83/04; C08K 5/01
[52] U.S. Cl. .................................. 524/506; 524/491; 524/505; 523/118
[58] Field of Search ................. 524/491, 505, 506; 523/118

[56] References Cited

U.S. PATENT DOCUMENTS

| | | | |
|---|---|---|---|
| 3,972,848 | 8/1976 | Lakshmanan | 524/505 |
| 4,248,759 | 2/1981 | St. Clair | 524/505 |
| 4,291,139 | 9/1981 | Halasa et al. | 524/505 |
| 4,650,817 | 3/1987 | Allen, Jr. et al. | 523/105 |

*Primary Examiner*—Paul R. Michl
*Assistant Examiner*—LaVonda R. DeWitt
*Attorney, Agent, or Firm*—Michael J. Hughes

[57] ABSTRACT

A method of performing a nonsurgical blepheroplasty is provided which involves adhering opposing eyelid surfaces together to arrest ptosis or eyelid droop. Specific adhesive compositions are provided to permit oxygen permeability, long-lasting adherence and to be nontoxic with respect to the tissues involved. The adhesive is a mixture including an adhesive component, a thermoplastic elastomer component and a solvent component, with a midblock tackifier being an optional ingredient. The method and composition of the invention are primarily of utility to physicians and direct users seeking to bond human tissues together without the necessity of resorting to surgical techniques and is especially adapted to eyelid blepheroplasty procedures.

19 Claims, No Drawings

ADHESIVE FORMULATION FOR NONSURGICAL BLEPHEROPLASTY

This application is a continuation in part of 07/446,394, Dec. 5, 1989, now abandoned.

TECHNICAL FIELD

The present invention relates generally to medical technology and to methods of tissue adhesion. Specifically the invention relates to adhesive formulations for use with living tissue and to a process for bonding eyelid tissue for the purposes of blepharoplasty.

BACKGROUND ART

Ours is a society very concerned with image. Personal appearance is a major concern to nearly everyone. It is of sufficient import to many people that they choose to alter their appearance through cosmetic surgery.

Cosmetic surgery can be used both to modify a person's natural attribute and to battle the aging process. "Face lifts" and "eye lifts" are relatively common procedures in this field. The procedure this invention is chiefly concerned with is the eye lift, more properly termed blepharoplasty.

Blepharoplasty is the procedure used to eliminate ptosis, or droop of the upper eyelid. This is generally required when, as a person ages, the skin in the vicinity of the eyelid loses elasticity and begins to sag. The condition can have other causes, but aging is the main culprit.

Currently, blepharoplasty is performed by surgically removing a wedge of tissue from the mid-region of the eyelid, then stitching the exposed edges together. This process obviously entails trauma to the eyelid, enough so that a two to four week healing process is required. Naturally, one would like to be able to reduce or eliminate the healing time required. In order to accomplish this, another method of contracting the eyelid must be used.

One alternate method is bonding epidermal tissue through the use of adhesives. One consideration inherent in the use of tissue adhesives would be the possibility of toxicity problems. Research indicates that this is not an insurmountable problem for some adhesives, including medical adhesives used for other purposes. Additionally, the problem may be solvable by the use of some cyanoacrylates. See, e.g., "Synthesis and Bioevaluation of a Rapidly Biodegradable Tissue Adhesive: 1, 2 - Isopropylidene Glyceryl 2 - Cyanoacrylate", Jaffe, et al., Journal of Biomedical Materials Research, vol. 20, pp. 213-217 (1986).

It has also been shown that adhesive material can be used to effect a bond of the eyelid tissue. Harold D. Clavin, M.D., in his article "Nonsurgical Upper Blepharoplasty", Plastic Reconstructive Surgery, November, 1985, 76(5), pp. 784-787, disclosed a method using double sided tape and an applicator. In the Clavin method, a fold in the upper eyelid is secured by a segment of tape of appropriate size and shape. Originally, the Clavin method had been intended only to give prospective patients an idea of the results obtainable through surgical blepharoplasty. The idea was met with such enthusiasm that the tape is now being used as a temporary cosmetic enhancement.

One drawback to the Clavin method is that its effect may be very short lived. The longest wearing time disclosed in Clavin's article is seven days. Patients desiring a more permanent effect are forced to undergo surgical blepharoplasty. There are currently no intermediate choices available. In view of this situation, it can be seen that there exists a need for a semi-permanent form of non-surgical blepharoplasty.

DISCLOSURE OF THE INVENTION

Accordingly, it is an object of the present invention to provide a method of relieving ptosis without the use of surgery, i.e. non-surgical blepharoplasty.

It is a further object of the present invention to provide a method that is semi-permanent in nature.

It is another object of the present invention to provide a method of blepharoplasty that can be performed easily in an office visit, or potentially by the patient personally at home.

Briefly, the present invention is a method of nonsurgical blepharoplasty. The procedure involves simply taking a tuck in the eyelid, preparing the skin surface to be clean and dry, and securing the truck with adhesive mixture. The adhesive mixture must be selected to allow oxygen permeability. Since most adhesives do not allow oxygen transmission, the base adhesive component is an oxygen permeable polysiloxane (adhesive component) to insure that the eyelid tissue will receive oxygen. In the preferred embodiment, the adhesive mixture also includes a solvent which prevents the adhesive component from bonding permaturely. A proper ratio of the components must be maintained to provide the properties desired from the mixture. A balance must be struck between the desire for permanence of the bond and the need for the tissue of the eyelid to receive oxygen. Additional adhesive can be obtained with the use of tackifiers such as those of the polyterpene variety. The mixture is also adapted to be formulated and then dried so as to be relatively free of solvent and in solid form for some uses. The solvent is then reapplied at the time of usage to reconstitute (at least partially) the overall mixture.

The preferred embodiment and the first alternate preferred embodiment utilize a medical grade silicone adhesive as the gas permeable component together with a thermoplastic elastomer to improve skin adhesion, and one or more organic solvents as the solvent component. The specific adhesive mixture of the preferred embodiments provides breathable long-term (believed to be up to six months) bonding of the eyelid tissues.

A second alternative embodiment, which may also be acceptable but may be less suitable since the chemical components pose a greater hazard, is an adhesive mixture based on the cyanoacrylate family of adhesives. In the alternate embodiment of the adhesive mixture, a cyanoacrylate adhesive component is mixed with two separate silicon oil components which provide both lubrication and breathability to the skin surfaces. The cyanoacrylate does not require a separate solvent component, and the silicon oils provide both the gas permeability component and skin lubricants.

In practice, a neutralizer will be provided with the adhesive mixtures of the present invention so that the mixture can be removed if desired. For the preferred embodiment and the first alternate embodiment the neutralizer is the same as the solvent while the alternate embodiment utilizes a cyanoacrylate-specific neutralizer. This can become necessary if a mistake is made, or if the patient/user is not happy with the results achieved. Since the mixture is a low cost item, the procedure can be repeated until the patient/user is completely satisfied with the results.

An advantage of the present invention is that the patient can obtain the benefits of the blepharoplasty procedure without the normally attendant healing time.

Another advantage of the present invention is that it is very inexpensive, particularly relative to standard blepharoplasty.

A further advantage of the present invention is that since it is so simple and inexpensive, it can be repeated as often as the patient desires.

These and other objects and advantages of the present invention will become clear to those skilled in the art in view of the description of the best presently known mode of carrying out the invention and the industrial applicability of the preferred embodiment as described herein.

BEST MODE OF CARRYING OUT THE INVENTION

The present invention relates to a group of tissue-bonding adhesives and specifically to the use of a tissue-bonding adhesive in a method for performing a nonsurgical blepharoplasty. The blepharoplasty procedure involves the tucking of folds of skin in the eyelid together in order to prevent ptosis or "dropping eyelid". The nonsurgical blepharoplasty is utilized as an alternative to surgically removing tissue, with the accompanying trauma and other disadvantages.

The method of performing a nonsurgical blepharoplasty involves the determination by competent medical personnel that a blepharoplasty is called for in a particular patient. If the eyelid droop problem is occurring and the degree of the problem is not so great as to mandate a surgical procedure, then it may be determined that the nonsurgical blepharoplasty of the present invention may be appropriate.

In the method of the present invention, the practitioner will select the particular portions of the eyelid which are to be bonded together in order to accomplish the appropriate degree of tucking of tissue so as to eliminate the droop. Once the opposing surfaces to be bonded together have been selected, they are prepared such that they are clean and dry and suitable for adhesive bonding. The practitioner then performs the step of applying a specialized adhesive mixture to one or both of the prepared surfaces and then causes the surfaces to come into contact, through the adhesive. Once the contact has been physically maintained by the practitioner, either through tissue clamping or by direct holding by the practitioner, for a length of time sufficient to allow the adhesive to dry and form a firm bond, the process is effectively complete.

An alternate application method utilizes a "dry" form of adhesive. In this alternate method the adhesive is prepared and is then applied to a carrier surface. A preferred carrier surface is a release paper selected to be pliable, nontoxic and relatively nonabsorbent. The adhesive solvent is then evaporated to leave a dry residue on the release paper. This permits stable storage. The adhesive is then reactivated at the time of use.

It is preferable that the carrier material be coated with adhesive residue on both sides and then cut into appropriately sized and shaped pieces to match the areas of tissue to be bonded. The practitioner then reactivates the adhesive by applying a quantity of a solvent, such as by swabbing the carrier surfaces, or the tissue areas, or both, and applies the carrier material to the tissue surfaces. The tissue is then held in place, as by clamping, for a sufficient interval for complete bonding. The carrier material remains in place for the life of the bond, usually three to six months.

The adhesive mixture of the present invention is a very significant component in the success of the blepharoplasty procedure. Only an adhesive which (1) is nontoxic to the skin surfaces, (2) allows gas permeability so that oxygen may reach the skin surfaces and the tucked skin, and (3) may be removed without damage to the surrounding tissue, is acceptable for such a purpose. For the above reasons, the preferred adhesive mixture to be utilized include an adhesive component for actually bonding the surfaces together, a component which provides gas permeability (congruent in the preferred embodiment), a thermoplastic elastomer to enhance skin adhesion and to provide lubrication to the skin surfaces, and a solvent component for keeping the adhesive from prematurely bonding the surfaces before the practitioner has had an opportunity to make adjustments, and also to aid the adhesive mixture in maintaining its potency during storage, and an antioxidant to prevent degradation and discoloration.

In the preferred embodiment, and also in the first alternate embodiment, the adhesive component is a commercially available chemical known as Dow-Corning DC-355 Medical Adhesive. This is a polysiloxane type of adhesive and belongs to the silicone family of chemical compounds. Although the DC-355 Medical Adhesive has been found to be the most effective for the purposes of the present invention, other possible substitutes which might be utilized include the Dow Corning Products Bio-PSAQ7-2920, X 7-3027, X 7-2684 and X 7 2960. These adhesives are characterized by providing good oxygen permeability as well as adhesion.

Although the discussion below and the charts illustrated refer to unitary item, it is understood that this is not necessarily a commercial reality. The values referred to herein actually apply to the solids component (active ingredients) of the adhesive. The DC-355 adhesive is available in solvent carriers but, at the present time, not in hydrocarbons such as cyclohexane. The common solvent present in the DC-355 commercially available is trichlorofluoroethane (TCE). Accordingly, prior to incorporation into the mixture, the solids in the DC-355 adhesive are extracted from the existing TCE carrier solvent. The extraction is preferably performed using heat to evaporate the TCE, which is undesirable in eye contact usages.

The elastomer component of the preferred embodiment, which provides enhanced adhesion, is a thermoplastic elastomer of the styrene-isoprene-styrene type and is commercially available as Kraton 1102. Kraton 1102 is a formulation developed by Shell Chemical which is fully miscible with the cyclohexane modified DC-355 solution and provides a true solution, thus aiding in uniform application of the adhesive mixture to the skin surfaces. Although the Kraton 1102 formulation is the preferred elastomer component, other substitute elastomeric components which might be effective in an adhesive mixture include Kraton 1101; Kraton 1107 and Kraton 1111 which are styrene-butadiene-styrene polymers, all commercially available from the same sources as Kraton 1102.

In the preferred embodiment, and the first alternate embodiment, the use of a solvent component is desirable to support the other components of the adhesive mixture during storage, transport and application and also to maintain the wetness of the adhesive mixture for a length of time sufficient to allow fine-tuning and adjustment of the skin fold placement during application. In the preferred embodiment, the selected solvent component is cyclohexane ($C_6H_{12}$). The cyclohexane, which is a paraffinic hydrocarbon, is considered a safe chemical for external human use which provides an effective solvent for the adhesive component and the elastomeric component while being quick-drying such that it is not necessary to hold the surfaces in juxtaposition for an excessive length of time before the bonding effect of the adhesive component is sufficient to hold the position indefinitely. In addition to cyclohexane, other solvent components which might be effective include hexane, octane, decane and naphtha type solvents. Paraffinic hydrocarbon solvents, such as these listed above, are particularly useful in solutions of this nature.

In the preferred embodiment the components are combined by dissolving the solids in the solvent. An impellor device or a double planetary mixer such as those manufactured by Charles Ross & Son Company, is effective for this step. The ratios set forth below relate to those found most effective for obtaining a true solution.

The ratio of the components in the adhesive mixture is of significant importance to the effectiveness of the mixture. Although minor variations from the preferred ratios are permissible while retaining effectiveness, it is desirable to have the components present in an approximate weight ratio in order to achieve maximum effectiveness. The presently preferred weight ratio of the preferred components is listed below in Table A-1, while an alternate weight ratio for the first alternate embodiment is listed in Table A-2.

TABLE A-1

| Component | Weight Ratio | Weight Percentage | Weight in Batch |
|---|---|---|---|
| adhesive solids Dow-Corning DC-355 Medical Adhesive | 1 | 19.2% | 50.0 g |
| elastomer Kraton 1102 | 1 | 19.2% | 50.0 g |
| solvent Cyclohexane | 3.2 | 61.5% | 160.0 g |

TABLE A-2

| Component | Weight Ratio | Weight Percentage | Weight in Batch |
|---|---|---|---|
| adhesive solids Dow-Corning DC-355 Medical Adhesive | 5.41 | 51.7% | 20.0 g |
| elastomer Kraton 1102 | 1 | 9.6% | 3.7 g |
| solvent Cyclohexane | 4.05 | 39.7% | 15.0 g |

Tables A-1 and A-2, above, show the presently preferred compositions of the adhesive mixture. The middle column illustrates the preferred weight ratio among the components, with the elastomeric component providing the smallest fraction of the total. The weight percentage is simply another manner of expressing the weight ratio, and the far right column illustrates a typical batch of the adhesive mixture which will produce a total of 260 grams of the preferred mixture (A-1) and 38.7 grams of the first alternate mixture (A-2).

Enhanced embodiments of the preferred adhesive mixtures include, as a further component, a midblock tackifier. The purpose of the midblock tackifier is to improve the degree of adhesion between the adhesive mixture and the associated tissues. In particular, the midblock tackifier enhances the quick stick properties and the 180-degree peel adhesion of the adhesive mixture. In the preferred embodiment, the selected midblock tackifier component would be in the nature of a styrenated terpene. The preferred styrenated terpene is Wingtack 95, commercially available from Goodyear Chemical. The styrenated terpene would be utilized with the formulations of Tables A-1 and A-2 in the similar quantities as the elastomer component.

The solutions produced in accordance with Tables A-1 and A-2 are appropriate for immediate usage in applications such as blepharoplasty. However, as discussed above, a "dry" form of the adhesive mixture is desirable for shipping and storage. For such situations the adhesive mixture is applied to a release paper or similar carrier surface medium, preferably by a coating machine such as a roller coater or a knife coater. The mixture is then dried to leave an adhesive residue in solid form on the carrier surfaces. Subsequent contact with an appropriate solvent at the time of usage reconstitutes the mixture and allows proper bonding.

The formulations for the enhanced preferred embodiment and the enhanced first alternate embodiment of the present invention are illustrated below in Tables B-1 and B-2, with the batch components in this case representing a total quantity of adhesive mixture of 301.25 grams in the preferred embodiment (B-1) and 42.4 grams in the first alternate embodiment (B-2).

TABLE B-1

| Component | Weight Ratio | Weight Percentage | Weight in Batch |
|---|---|---|---|
| adhesive solids Dow-Corning DC-355 Medical Adhesive | 50.0 | 16.6% | 50.0 g |
| elastomer Kraton 1102 | 50.0 | 16.6% | 50.0 g |
| solvent Cyclohexane | 160.0 | 53.1% | 160.0 g |
| midblock tackifier styrenated terpene | 40.0 | 13.3% | 40.0 g |
| antioxidant hindered phenolic | 1.25 | 0.4% | 1.25 g |

TABLE B-2

| Component | Weight Ratio | Weight Percentage | Weight in Batch |
|---|---|---|---|
| adhesive solids Dow-Corning DC-355 Medical Adhesive | 5.41 | 47.2% | 20.0 g |
| elastomer Kraton 1102 | 1 | 8.7% | 3.7 g |
| solvent Cyclohexane | 4.05 | 35.4% | 15.0 g |
| midblock tackifier styrenated terpene | 1 | 8.7% | 3.7 g |

It is expected that the enhanced embodiments according to the mixture of Tables B-1 and B-2 will provide a longer-lasting bond and one that is less susceptible to deterioration from normal movement and atmospheric conditions. The particular type of styrenated terpene to be utilized as the midblock tackifier is Wingtack 95, although other available tackifiers such as Piccolyte S115, Piccoltye S100 and Croturf 2 products from Crosby Chemical [a poly (beta) terpene resin] would also be acceptable.

The use of the antioxidant in the preferred embodiment (Table B-1) prevents degradation of the mixture and such side effects as discoloration, a potential problem in a visible application, such as a blepharoplasty.

The enhanced embodiments, including the midblock tackifier component, provide a much better peel strength than the uninhanced adhesives. In 180° peel tests on leather substrates, the preferred enhanced embodiment of Table B-1 was found to have a peel strength of approximately 9 psi while the Dow Corning 355 adhesive alone produced a peel strength of 3 to 5 psi.

The substantial difference between the presently preferred embodiment (Tables A-1 and B-1) and the first alternate embodiment (Tables A-2 and B-2) relates to storage life. Although both embodiments have been found to function properly in use, the alternate embodiment is not truly miscible and has a tendency to separate over a period of time. The preferred embodiment is a true solution and has been found to be stable in storage, and is thus preferred for purposes wherein a delay is likely between formulation and usage.

The above examples of Tables A and B illustrate the manner of making substantial quantities of the adhesive mixture. In practice it is expected that an amount of adhesive mixture equal to 14 grams (0.5 oz) or 5 ml. (0.17 fl. oz.) will be sufficient to perform a standard blepheroplasty. Accordingly, it is presently expected that the adhesive mixture will be packaged in single application dose packets as well as in bulk, so that a disposable single use package will be available.

Although the adhesive mixture has been primarily described as being adapted for use in the blepharoplasty procedure, its use is by no means limited to this process. It is expected that the adhesive mixture of the preferred embodiment will also be adaptable for use as a tissue adhesive in other body locations and may be usable for such purposes as wound closure. Any usage in which it is desirable to adhere surfaces of living tissue together will be appreciated for the adhesive mixture. It is also expected that there will be substantial viability for usage of the adhesive mixture in veterinary applications.

Although the potential harshness of the adhesive component involved might limit the usage with respect to human tissue, a further effective second alternate embodiment of the present invention of the adhesive mixture is based upon the cyanoacrylate family of adhesives combined with silicon oils to provide suspension, lubrication and gas permeability. In the alternate adhesive mixture formulation, the base adhesive component is one of the family of adhesives known as cyanoacrylates. The silicon oils are polydimethylsiloxane ("PDS") and 3-methacryloxypropyltris (trimethylsiloxy)silane ("3-methacryloxy").

The proportions (weight ratios) of the components of the second alternate embodiment of the inventive adhesive mixture are 2:1:1, that is 50% cyanoacrylate, 25% PDS, and 25% 3-methacryloxy. The three components are miscible with each other, so that a homogeneous mixture is formed when the components are brought together. The three components can be mixed together before application, or applied serially. If applied serially, the PDS is applied first. PDS is very oily, and will penetrate the surface of the tissue to some extent. The 3-methacryloxy is then applied to further prepare the tissue surface. Finally, the cyanoacrylate is applied to bond the tissue surfaces together after the desired tuck is taken.

It is envisioned that in the second alternate embodiment as well as in the preferred embodiments, the components of the adhesive mixture will be mixed before application. The mixture will most likely be dispensed from a tube. A further alternate embodiment would have the cyanoacrylate in one tube and the PDS and 3-methacryloxy in a separate tube. It is envisioned that the user could apply the mixture personally, although a simple medical office procedure would be utilized in at least the initial instance.

In practice, the mixture is applied to the eyelid, and whatever size and shape tuck is desired may be taken. The mixture adheres in approximately five minutes and remains somewhat flexible during that time, so that after application the conformation of the eyelid may be adjusted to the user's satisfaction. Further, a neutralizer will be made available so that the procedure can be "erased" and started again from the beginning.

Once applied, the adhesive will remain effective for an extended wear time frame, presently believed to be approximately three months. At that time, the practitioner/patient/user may simply repeat the process, if desired.

Those skilled in the art will readily observe that numerous modifications and alterations of the device may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The method of nonsurgical blepharoplasty of the present invention is a simple alternative to surgical procedures. It will allow a user to eliminate any drooping of the eyelid tissue. The user can perform the procedure personally, as often as desired. The cost of the procedure will be only a fraction of the cost of surgical blepharoplasty and will produce no trauma.

It is also evidenced that the present invention may be adapted for use in wound closure. That application would expand the potential market to include use in all surgical procedures and in treatment of injuries.

For the above reasons it is expected that the method for nonsurgical blepharoplasty of the present invention will have widespread applicability. It is expected that the present invention will enjoy substantial commercial utility.

We claim:

1. An adhesive mixture suitable for bonding human tissue surfaces together for extended lengths of time, comprising:
   an adhesive component which includes a siloxane adhesive, said adhesive component being non-toxic to human tissue and forming a strong bond thereto, for providing gas permeability to the bonded human tissue surface such that oxygen is permitted to reach the bonded tissue;
   a thermoplastic elastomer component for providing bond strength to enhance the bonding characteristics of the adhesive component without substantially interfering with said gas permeability; and
   a parafinnic hydrocarbon solvent component for suspending bonding of the adhesive component until the solvent component has evaporated.

2. The mixture of claim 1 wherein
   the adhesive component is polysiloxane, as typified by Dow Corning DC-355 medical adhesive.

3. The mixture of claim 1 wherein
the thermoplastic elastomer component is a styrene-isoprene-styrene block copolymer, wherein the styrene content of the copolymer is in the range of 15% to 30%.

4. The mixture of claim 1 wherein
the mixture is applied to a carrier material and the solvent component is allowed to evaporate therefrom, leaving a dry residue on said carrier material, said dry residue being adaptable to being reactivated by contact with an amount of the solvent component.

5. The mixture of claim 1 wherein
the thermoplastic elastomer component is the Kraton 1102 formulation of styrene-isoprene-styrene.

6. The mixture of claim 1 wherein
the parafinnic hydrocarbon solvent component is selected from the group including; cyclohexane, hexane, octane, and decane.

7. The mixture of claim 1 wherein
the parafinnic hydrocarbon solvent component is cyclohexane.

8. The mixture of claim 1 and further including
a tackifier component.

9. The mixture of claim 8 wherein
said tackifier component is the Wingtack 95 formulation.

10. The mixture of claim 9 wherein
said carrier material in a relatively nondegradable, nontoxic, nonabsorbent planar sheet material having properties similar to those of release paper.

11. The mixture of claim 1 and further, including
an antioxidant component in the form of a hindered phenolic compound adapted to prevent oxidization of the mixture.

12. The mixture of claim 1 wherein
the adhesive component is Dow Corning DC-355 medical adhesive;
the thermoplastic elastomer component is the Kraton 1102 formulation of styrene-isoprene-styrene;
the parafinnic hydrocarbon solvent component is cyclohexane; and
wherein the mixture further includes a tackifier component, in the form of Wingtack 95, and a hindered phenolic antioxidant component.

13. The mixture of claim 12 wherein
the weight ratio among said components is: adhesive silicone polymer component, 50; thermoplastic elastomer component, 50; parafinnic solvent component, 160; tackifier component, 40; and hindered phenolic antioxidant component, 1.25.

14. The mixture of claim 1 wherein
the adhesive component is Dow Corning DC-355;
the thermoplastic elastomer is Kraton 1102;
the parafinnic solvent component is cyclohexane; and
the tackifier component is a styrenated terpene midblock tackifier;
wherein the weight ratio among the components is: adhesive component, 5.41; elastomer component, 1; solvent component, 4.05; and tackifier component 1.

15. A high strength oxygen permeable adhesive composition for human tissue bonding, comprising:
a nontoxic silicone polymer adhesive component, characterized by providing both adhesion and oxygen permeability to the adhesive composition such that oxygen may reach underlying tissue;
a thermoplastic elastomeric component, for providing enhanced bond strength to the adhesive composition without substantially interfering with said oxygen permeability;
a tackifier component for providing rapid adhesion; and
a parafinnic hydrocarbon solvent component for preventing premature bonding.

16. The adhesive composition of claim 15 wherein
the adhesive component predominantly includes Dow Corning medical adhesive DC-355.

17. The adhesive composition of claim 15 wherein
the thermoplastic elastomeric component is a styrene-isoprene-styrene block copolymer.

18. The adhesive composition of claim 15 wherein
the tackifier component is a terpene derivative; and the parafinnic hydrocarbon solvent is cyclohexane.

19. The adhesive composition of claim 15 wherein
the adhesive component is Dow Corning DC-355 medical adhesive;
the thermoplastic elastomeric component is Shell Kraton 1102;
the tackifier component is Wingtack 95;
the parafinnic hydrocarbon solvent is cyclohexane; and
the composition further includes a hindered phenolic antioxidant;
wherein, the weight ratio among the components is: said Dow Corning DC-355, 50; said Shell Kraton 1102, 50; said Wingtack 95, 40; said cyclohexane, 160; and said hindered phenolic antioxidant, 1.25.

* * * * *